Patented June 29, 1948

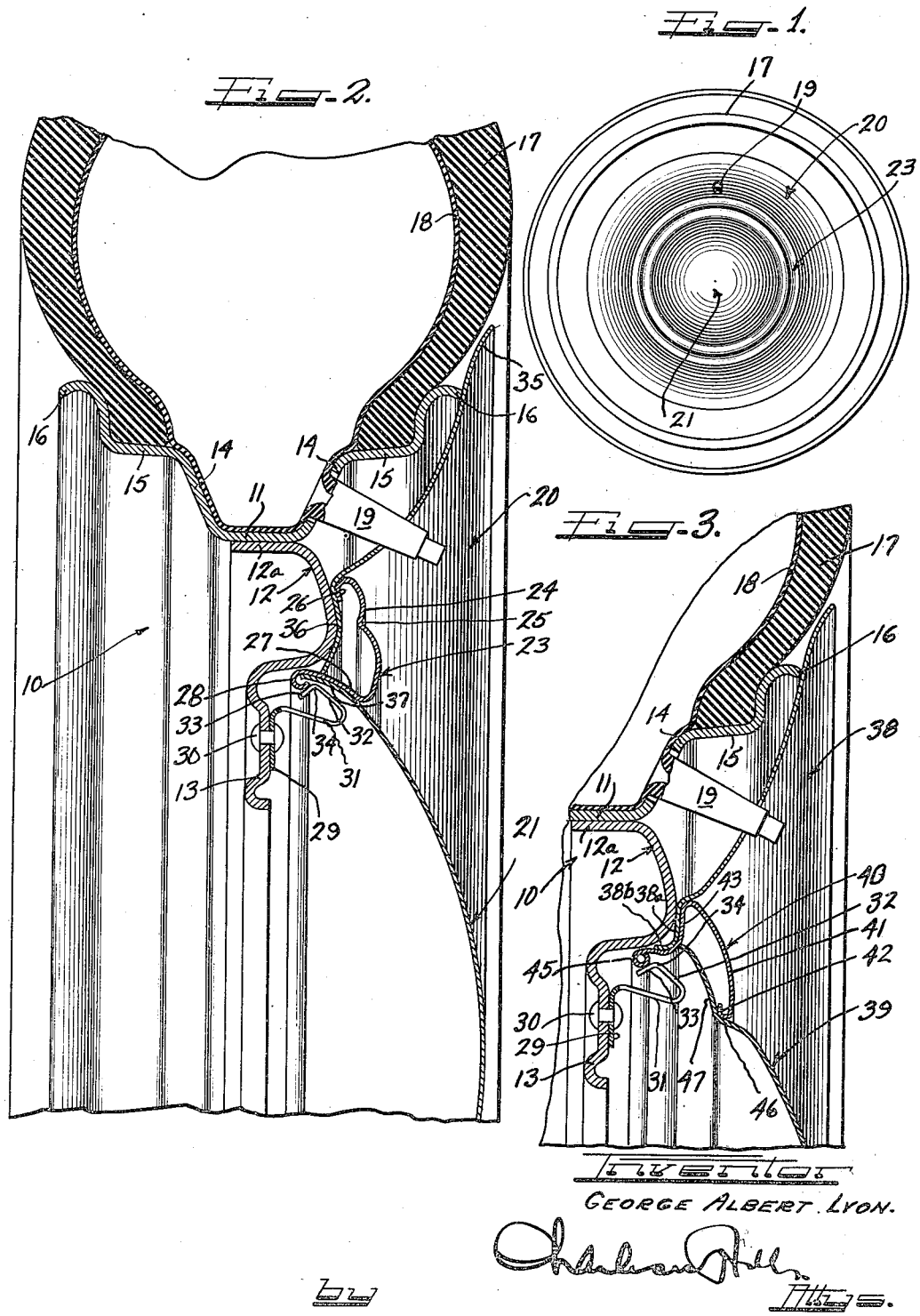

2,444,051

UNITED STATES PATENT OFFICE 2,444,051

WHEEL COVER

George Albert Lyon, Allenhurst, N. J.

Application September 6, 1943, Serial No. 501,347

4 Claims. (Cl. 301—37)

This invention relates to vehicle wheels and is directed more particularly to an improved cover assembly therefor.

It is an important object of the invention to provide improved retaining means for maintaining a multi-part wheel assembly detachably over the outer side of a wheel structure.

It is still another object of the invention to provide for disposition over the outer side of a wheel structure, a multi-part cover assembly including a radially outer annular cover portion and a central circular hub cap simulating cover portion, these portions being formed from a sheet synthetic plastic material and having physical characteristics enabling them to be self-supporting as to form and yet resiliently locally flexible so that they immediately snap back into initial position upon release of distorting pressures therefrom, and novel retaining means for securing said cover portions together to provide a unitary cover assembly, the retaining means serving as an intermediate ornamental member for concealing the junction between the cover portions, for intermediately rigidifying and reinforcing the same and also for serving as the instrumentality by means of which the cover assembly may be secured to the outer side of the wheel structure in snap-on pry-off relationship.

It is still another object of the invention to provide for disposition over the outer side of a wheel structure a cover assembly including an outer annular portion formed from synthetic plastic material or the like, said cover portion having a cross-sectional shape of such configuration and magnitude that it extends entirely over the outer side of the radially outer part of the wheel structure to conceal the same and radially outwardly beyond the edge thereof to conceal the junction between the same and a tire therein and furthermore to simulate the side wall of a tire on the wheel structure thus to give the appearance of being a continuation of the side wall of the tire and to give the appearance of being the white side wall of a massive tire, when colored white.

Still another object of the invention is to provide for disposition over the outer side of a wheel structure a multi-part cover assembly which entirely conceals the entire outer side of the wheel, said cover assembly being formed substantially entirely from a synthetic plastic sheet material thereby to greatly reduce the unsprung weight of the vehicle to which it is attached.

Still another object of the invention is to provide a multi-part cover assembly in which the portions thereof are preferably formed from a synthetic sheet plastic material and in which there is provided an annular retaining member for securing the cover parts together, said retaining member being arranged to reinforce the intermediate portion of the cover assembly where the cover parts are joined and also serving as the instrumentality by which the cover assembly is retained on the wheel structure in snap-on, pryoff engagement, whereby pry-off forces applied to the cover assembly are borne by the rigidifying, reinforcing retaining member rather than by the cover parts themselves.

In accordance with the general features of the invention there is provided herein a multi-part cover assembly including a radially outer annular part and a central circular hub cap simulating part, these parts being formed from synthetic plastic sheet material having physical characteristics enabling them to be self-supporting as to form and yet resiliently flexible upon the application of distorting pressures thereto whereby they will immediately snap back into their original configuration upon the release of said distorting pressures, there also being provided an annular sheet metal reinforcing member having a portion arranged to retainingly receive the inner peripheral margin of the radially outer cover part and the radially outer margin of the central circular hub cap part and being further provided with axially inner means for retainingly engaging resilient retaining elements on the wheel structure and having an axially outer part arranged to overlie the portion of the cover assembly comprising the junction between the cover parts.

Other objects and advantages of the invention will become apparent from the following description and accompanying drawings in which:

Figure 1 is a side elevational view of a wheel structure embodying one form of my invention;

Figure 2 is a fragmentary radial cross-sectional view of a wheel structure embodying the invention shown in Figure 1; and Figure 3 is a fragmentary radial cross-sectional view of a modified form of my invention.

It will be understood that the embodiments shown herein are for illustrative purposes only and may be changed or modified without departing from the spirit and scope of the invention as set forth in the appended claims.

In the construction shown in Figure 2, the wheel assembly with which my invention is associated includes a tire rim 10 of the drop center rim type having a base flange 11 to which is secured, by riveting or welding or the like, a central load bearing portion 12 having an axially inwardly extending skirt or flange 12a thereon adapted for attachment to the radially inner surface of the base flange 11. The central load bearing portion 12 is further provided with a bolt-on flange 13 which may be utilized for securing the wheel structure to an appropriate part of the vehicle with which it is associated, such as the brake drum or the like.

The tire rim 10 is further provided with opposite side flanges 14, opposite intermediate flanges 15 and opposite edge portions 16 between which may be disposed the radially inner part of a pneumatic tire 17 having an inner tube 18 provided with a valve stem 19. The valve stem 19 is aligned with a suitable aperture in the adjacent side wall flange 14 and extends therethrough to be accessible for inflation of the tire.

The cover assembly shown in Figure 2 includes a radially outer annular portion 20 and a central circular hub cap simulating portion 21, these portions, as will be seen presently, being secured together to provide a unitary circular cover assembly for disposition over the outer side of the wheel structure.

These cover portions 20 and 21 are preferably formed from sheet synthetic plastic material and have physical characteristics enabling them to be self-suporting as to form yet resiliently, locally, flexible upon the application of distorting forces and being capable of immediately snapping back to their initial configuration immediately upon release of these distorting forces.

To the end that the cover assembly comprising the portions 20 and 21 may be rigidfied and reinforced at an intermediate part thereof, and so that the junction of the cover part may be concealed and further in order to afford an efficient, detachable engagement of the cover assembly with the wheel structure, there is provided herein an annular member 23 which includes a generally radially extending portion 24 which may be intermediately ribbed as at 25 to strengthen the same and to augment the ornamental appearance thereof, and which further may be provided at the radially outer edge with a turned back flange 26 for presenting a smooth surface to the cover member 20 in a manner to be presently described. The retaining annulus 23 is further provided at the radially inner portion thereof with a generally axially inwardly extending flange 27 which, as shown herein, is slightly obliquely disposed in that it flares radially outwardly to a slight degree. This flange 27 terminates in a round edge 28 which serves to reinforce the same and furthermore serves as a retaining element as will be described presently.

The retaining means provided on the wheel structure includes an annulus 29 which may be welded or riveted to the bolt-on flange 13 as shown at 30. The annulus 29 terminates at the radially outer edge thereof in generally axially outwardly, radially inwardly, obliquely disposed, circumferentially spaced arm members 31 having turned back portions 32 which extend generally radially outwardly, axially inwardly and terminate in radially inwardly, axially inwardly extending finger members 33. Thus there is formed between the portions 32 and 33 a radially outwardly extending peak 34. Preferably the retaining annulus and the associated parts thereof are formed from thin sheet metal or the like whereby they possess inherent resilience so that the portions 31 and 32 may be flexed radially under circumstances to be explained presently.

As will be seen, the outer annular cover 20 is provided at the radially outer part thereof with an outwardly flared portion 35 which extends radially outwardly beyond the edge portion of the tire rim to conceal the junction between the same and the tire therein, this portion being arranged to present to the tire a smooth surface during lateral expansion of the tire under load bearing conditions. The cover portion 20 is provided at the radially inner part thereof with a flange 36 which is arranged to extend axially inwardly around the flange 26 of the retaining member 23 and thence radially inwardly so that the edge thereof supportingly abuts the adjacent portion of the radially outer surface of the flange 27 of the retaining member 23.

The radially outer portion of the central circular cover member 21 is provided with a flange 37 having a curvature similar to and being disposed at a similar angle to the flange 37 of the retaining member 23. Thus, when in the position shown in Figure 2, the flange 27 of the cover member 21 is securely retained within the annulus 23 to complete a multipart, unitary cover assembly held together by the member 23.

With the foregoing construction it will be seen that there is provided herein a multi-part cover assembly which is constructed generally from synthetic plastic sheet material having characteristics enabling it to be self-supporting as to form and yet resiliently, locally flexible to return to its initial configuration when distorting pressures are relieved therefrom, this cover assembly being of extremely light weight to reduce the unsprung weight of the vehicle with which it is associated and being resiliently flexible and yet being sufficiently ornamented and rigidified or reinforced at an intermediate part thereof to have the strength of the metal covers heretofore used, this srengthening being accomplished by means of the intermediate annulus 23 which furthermore serves as the instrumentality for securing the cover to the wheel structure in a manner to be described.

In applying the cover assembly to the wheel structure, it will be seen that it is merely necessary to align the assembled unit concentrically with the wheel structure and to urge the same axially inwardly against the wheel, whereupon the bead 28 of the retaining member 23 urges the resilient members 31 and 32 of the respective retaining elements, extending from the annulus 29, radially inwardly so that the bead may pass over the peaks 34 between the members 32 and 33 of the retaining clips. After the cover assembly has been urged axially inwardly a distance shown in Figure 2, it will be seen that the clips then spring radially outwardly so that the portions 33 thereof bear against the bead 28 to urge the same axially inwardly and retain the cover upon the wheel structure.

It will be understood, of course, that in removing the cover assembly from the wheel structure the operations are the reverse from those described above. In other words, the operator merely flexes the radially outer margin of the cover member 20 axially outwardly to provide for the insertion of the point of a pry-off tool such as a screwdriver or the like. The point of the tool is then inserted behind the radially inner margin of the cover member 20 and thus behind the axially outwardly exposed portion of the intermediate reinforcing member 23 so that when an intermediate part thereof is fulcrumed against the edge portion 16 the point of the tool will move outwardly to withdraw the assembly from over the spring clips described above.

In the construction of Figure 2, it will be seen that the resilient cover member 20 extends between the axially inner surface of the flange 26 of the retaining member 23 and the adjacent portion of the outer surface of the central load bearing part 12 of the wheel structure. With this arrangement, the flange 26 and the adjacent portion of the cover member 20 serves as an abutment stop to delimit the axial inward movement of the cover assembly onto the wheel structure and furthermore the sandwiched portion of the cover serves as a resilient cushion to prevent the development of vibration and rattle in the assembly should the metallic intermediate annular member 23 or the retaining clips become sprung to a slight degree during use.

In the construction of Figure 3, the wheel structure and the retaining annulus and the clips thereon are similar to those shown in Figure 2.

In this construction, however, the cover elements 38 and 39 and the intermediate reinforcing, ornamenting annulus 40 are of a slightly different construction from those shown in Figure 2. In the assembly of Figure 3 the cover elements 38 and 39 are preferably constructed from a material similar to that explained in connection with Figure 2 and furthermore the radial expanse of the cover member 38 is similar to and possesses the attributes of that described in connection with the cover member 20 of Figure 2.

In this construction the annular member 40 is provided with an axially outer bead part 41 having the radially inner edge thereof turned back to form a flange 42 which, as will be seen presently, bears against and presents a smooth surface to the adjacent portion of the central cover member 39. The bead portion 41 of the member 40 may be of any suitable cross-sectional configuration but is shown herein as being axially outwardly convex. The radially outer edge thereof terminates in a folded back, radially inwardly extending flange 43 which merges into a substantially axially inwardly extending flange 44 terminating in a bead 45, this bead being rolled inwardly to facilitate the attachment of the assembly to the wheel structure in a manner to be presently described. It will be noted that preferably the junction between the flanges 43 and 44 is formed to provide a slight radially outwardly opening groove.

The inner marginal portion of the cover member 38 is formed to provide a flange 38a which extends radially inwardly and is adapted for surface abutment with the flange 43 of the member 40, this flange 38a terminating in a substantially axially inwardly extending curvate skirt 38b which is arranged for disposition in the groove or channel formed by the junction between the flanges 43 and 44 of the annular retaining member 40. It will be seen that the annular cover member 38 may be fitted to the annular retaining member 40 in the aforementioned relation by merely aligning the parts concentrically and moving the cover member 38 axially outwardly with respect to the rear portion of the annulus 40.

As will be seen from Figure 3, the radially outer margin of the central circular hub cap simulating member 39 is preferably formed at an intermediate portion thereof to provide a generally radially outwardly extending channel 46 and a generally radially outwardly extending flange 47, the channel 46 being arranged to receive the radially inner margin of the bead 41 of the annular member 40 and the flange 47 being arranged to extend radially outwardly behind the bead with the edge of the central cover member 39 bearing supportingly against the outer surface of the curvate junction between the flanges 43 and 44. Thus it will be seen that, by virtue of the foregoing attachment of the cover parts to the annular member 40, there is provided a unitary cover assembly in which the junction of the cover parts is concealed and ornamented by the metallic bead 40 which may be enameled or given a high luster as by chromium plating or polishing, in which the intermediate portion of the unitary cover assembly is rigidified and reinforced by means of the annulus 40 and which may be detachably secured to the wheel structure by virtue of the engagement of the bead 45 with the resilient retaining clips of the annulus 29 in the manner described in connection with the construction of Figure 2.

It will be seen that in the constructions of both Figure 2 and Figure 3 the radially outer annular cover portion is provided with a suitable aperture through which the valve stem 19 may project to be accessible for attachment of the nozzle of an air hose for inflation of the tire.

In the construction of Figure 3, as in the construction of Figure 2, the outer cover member 38 extends between the spacing portions of the annulus 40 and the outer surface of the load bearing portion 12 of the wheel structure, thus to effect a resilient cushion to eliminate the development of vibration and rattle between the metallic parts should either the clips or the annulus 40 become slightly sprung during use.

What I claim is:

1. In a wheel structure having a tire rim and a central load bearing portion, a cover assembly including an outer annular cover member and a central circular cover member, said cover members being formed from thin synthetic plastic material and having physical characteristics enabling them to be self-sustaining as to form and yet resiliently flexible so as to return of their own accord to original predetermined shape upon being released from deflection, and a retaining ring member for maintaining said cover members as a unitary assembly and for securing the assembly to the outer side of the wheel structure, said retaining member being of generally L-shaped cross sectional configuration, one of the legs of such member extending generally axially inwardly and having the margin of the central cover member in face-to-face engagement therewith, the inner margin of said axial leg being turned upon itself and affording retaining means for the edge of said central cover member, the remaining leg of said retaining member extending generally radially outwardly into overlapping relation to the inner margin of said outer cover member and having the radially outer edge thereof turned under and engaging said outer cover member, said axial leg being engageable with attachment means on the load bearing portion of the wheel structure, and said underturned edge of said radial leg pressing the engaged portion of the outer cover member against said load bearing portion of the wheel structure.

2. A structure as defined in claim 1 wherein the cover securing means on the load bearing portion of the wheel structure comprise spring clips acting on the turned margin of the axial leg of the retaining ring member to draw the cover assembly axially inwardly toward the load bearing portion, and said underturned edge of the radial leg and the interposed inner marginal portion of the outer cover member providing abutment stop structure to delimit the axial inward movement of the cover assembly onto the wheel structure under the influence of the spring clips.

3. A structure according to claim 1 wherein the radial leg of the retaining member provides a decorative bead concealing the juncture of the cover members therewith and has an intermediate annular reinforcing rib formation to strengthen the same and to augment the ornamental appearance thereof.

4. A structure as defined in claim 1 wherein the inner edge of the outer cover member intermediately engages the radially outer side of the axial leg of the retaining member, and the inside diameter of the outer member is less than the outside diameter of the axially inner extremity of the axial leg whereby the outer cover member is held interlocked in unitary assembly with the retaining member.

GEORGE ALBERT LYON.

REFERENCES CITED

The following references are of record in the file of this patent:

UNITED STATES PATENTS

| Number | Name | Date |
|---|---|---|
| 2,167,102 | Burger | July 25, 1939 |
| 2,190,669 | Lyon | Feb. 20, 1940 |